Patented May 22, 1951

2,554,464

UNITED STATES PATENT OFFICE 2,554,464

ORAL COMPOSITION

Alfred Kraus, Twickenham, Middlesex, England

No Drawing. Application May 22, 1947, Serial No. 749,876. In Great Britain February 28, 1944

Section 1, Public Law 690, August 8, 1946
Patent expires February 28, 1964

3 Claims. (Cl. 167—93)

This invention relates to preparations of commercial and medicinal value, which have the property of reducing the viscosity of mucus or of liquefying mucus.

Mucus is usually very viscous and sticky and it is often desirable to reduce its viscosity and stickiness in order to remove it from mucous membranes. Affections of the nose, throat, bronchi and other bodily organs are frequently caused or aggravated by the presence of injurious bacteria in accumulated viscous mucus. It is difficult to deal with such affections because the action of disinfectants and other medicaments is generally confined to the surface of these mucous accumulations and does not penetrate to the mucous membrane itself. Again, mucus is also present in the plaque or film which often covers the teeth and is difficult to remove owing to its stickiness and high viscosity.

Further, in the industrial treatment of animal mucus it is often advantageous to reduce the viscosity, as for example, in treating animal intestines in the manufacture of sausage skins.

It is an object of this invention to provide a composition which, applied to mucus, causes a reduction in its viscosity or stickiness. It is a further object of this invention to provide novel processes whereby the said reduction in viscosity or stickiness may be carried out.

Mucus invariably contains dehydrogenating or oxidising enzymes. Thus, for example, lactic dehydrogenase is regularly present in mucus and so also are catalase and peroxidase.

According to this invention a composition for application to mucus comprises a substance capable of acting as a hydrogen donator and as a substrate for a specific enzyme present in the mucus and a compound capable of acting as a hydrogen acceptor, or capable of being transformed into, or of generating, a hydrogen acceptor compound.

It will be appreciated from the foregoing that the precise character of the composition of this invention will depend to some extent on the character of the mucus to which it is intended to apply the composition.

The hydrogen donator compound, which serves as a substrate for the enzyme, can for example be lactic acid and this substance is of general utility. The hydrogen acceptor may for example be a per-compound. Whilst the mechanism of the reaction is not known with certainty, it is believed that the lactic acid is oxidised to pyruvic acid by the lactic dehydrogenase present in the mucus, that the hydrogen thus liberated from the lactic acid combines with oxygen, liberated from the per-compound by the action of the catalase, and that in the course of this chain of reactions those groups of the mucin responsible for its viscosity are affected.

The reaction lactic acid—pyruvic acid in the presence of lactic dehydrogenase—is reversible. If an excess of pyruvic acid is present the lactic dehydrogenase catalyses the reaction in the direction of lactic acid. Thus a preparation containing pyruvic acid and a per-compound may alternatively be employed.

The invention is not, however, confined to compositions which contain lactic acid or pyruvic acid and a per-compound. Thus for example the composition may contain succinic acid or its derivatives which in the presence of succinic dehydrogenase are oxidised to the corresponding fumaric compounds.

Fumaric acid can act as a hydrogen acceptor and used with lactic acid probably leads to the reaction represented by:

$CH_3.CHOH.COOH + HOOC.CH:CH.COOH \rightarrow CH_3.CO.COOH + HOOC.CH_2.CH_2COOH$ i. e. the lactic acid is oxidised to pyruvic acid and the fumaric acid is reduced to succinic acid. If the mucus contains succinic dehydrogenase the composition may contain lactic acid and succinic acid since the succinic dehydrogenase will oxidise the succinic acid to fumaric acid.

Generally speaking the compositions of this invention are rendered more effective by the presence of ferrous ions. These may be provided by including a ferrous salt in the composition or by including a ferric salt which under the conditions of use is reduced to a ferrous salt.

As already indicated, the most generally useful hydrogen donator is lactic acid. This will generally be present in the composition in the form of a lactate and whilst in theory any lactate may be employed there are certain practical disadvantages in using some of them. For example, silver lactate may cause black staining, e. g. of the teeth when used in a composition to be applied in the mouth, and barium lactate tends to be toxic. Calcium lactate is most generally useful as it is stable and exists as a dry powder. Ferrous lactate may also be employed. Of the hydrogen acceptors sodium perborate is very useful as it is very effective and is quite stable; magnesium peroxide and calcium peroxide are also useful. Per-salts in general and sodium perpyrophosphate in particular tend to form insoluble precipitates with calcium lactate but this is, in general, advantageous in that thereby the mucolytic effect of the compositions of the invention is combined with a mechanical action, the extent of which can be controlled, if desired, by including in the composition a mixture of citric acid and an alkali citrate. The addition of this mixture is also useful when urea-hydrogen peroxide is used as the hydrogen acceptor.

The composition of this invention may be employed in various connections both in medicine and in industry. The hydrogen donator and hydrogen acceptor, together with any additional substance which may be desirable, e. g. a ferrous salt as indicated above, may be included in any suitable medium to form a douche or other preparation.

The invention is also applicable to the provision of tooth-cleaning agents in the form of pastes or powders.

The above mentioned mucous plaque or film plays an important part in the onset and development of dental caries as well as in the formation of tartar. One of the main tasks of oral hygiene is, therefore, to remove this dental plaque. The dentifices used hitherto remove this plaque only in a very imperfect way through the action of incorporated abrasives and/or detergents. Their cleansing action thus is merely a mechanical one. Therefore, the places where their cleansing effect would be needed most, namely, the interstices between the teeth and the natural fissures and grooves on the tooth surface are not reached by these cleansing agents at all, as these places are inaccessible to mechanical cleansing.

It has been found that the mucin which is the component of the plaque responsible for its stickiness and viscosity can be treated by the preparation according to the invention to transform it into a non-sticky and easily soluble substance of low viscosity and any of the compounds already described can be utilised for the purpose, when prepared in the form of, for example, a dentifrice, mouth-wash, powder, gargle or tablet. This dentifrice possesses the advantage that it can be made in a form which is completely soluble in the mouth fluid and need not therefore contain any abrasive or detergent agent although, as already indicated, the dentifrice may combine a mucolytic and a mechanical effect when an enhanced cleasing effect is desired.

Tooth cleansing agents according to the present invention comprise the said substances admixed with the usual ethereal oils such as peppermint oil and with or without the usual bases of dentifrices. Disinfecting agents or agents that check fermentation, for instance, fluorine or vitamin K or neutralising agents may be added with the advantage that these agents can now reach the tooth surface proper where their action is mostly needed. Used in the usual dentifrices, those agents hardly ever reach the tooth surface proper, as they do not penetrate the dental plaque.

Since a dentifrice composition requires to be stable over a relatively long period it is desirable to avoid the presence of water in it. This can be done by using water-free glycerine, liquid paraffin, alcohol or other non-aqueous vehicle. The following are specific examples of dentifrices prepared according to the invention:

*Example I*

| | Parts by weight |
|---|---|
| Calcium sodium lactate | 30 |
| Liquid paraffin | 70 |

These are thoroughly mixed and there is then added

| | Parts by weight |
|---|---|
| Sodium perborate | 15 | and the whole again thoroughly mixed to form a paste.

*Example II*

| | Parts by weight |
|---|---|
| Calcium lactate | 60 |
| Magnesium peroxide | 40 |

This mixture is worked into a paste with water-free glycerine and the usual quantity of ethereal oils added as a corrective for the taste.

*Example III*

| | Parts by weight |
|---|---|
| Calcium lactate | 60 |
| Calcium peroxide | 20 |
| Calcium carbonate | 20 |

With the addition of a trace of essential oil this mixture can be worked up into a powder. With the further addition of water-free glycerine or gum the mixture may be worked into a paste.

The above examples are given solely by way of illustration and are in no way intended to confer any limitations on the scope of the invention. Thus, for example, the calcium lactate of Example II or Example III may be replaced by other lactates such as potassium or sodium lactate. The compositions may contain an abrasive such as tri-calcium phosphate.

I claim:

1. A dentifrice which comprises a lactate, and a per-compound which is capable of acting as a hydrogen acceptor under the influence of catalase and peroxidase.

2. A dentifrice which comprises a lactate, a compound selected from the class consisting of peroxides, per-salts and per-acids, and a substantially water-free medium for suspension of the mixture of said compounds.

3. A dentifrice which comprises a lactate, a compound selected from the class consisting of peroxides, per-salts and per-acids, a source of ferrous ions, and a substantially water-free medium for suspension of the mixture of said compounds.

ALFRED KRAUS.

REFERENCES CITED

The following references are of record in the file of this patent:

UNITED STATES PATENTS

| Number | Name | Date |
|---|---|---|
| 975,129 | Gruter | Nov. 8, 1910 |
| 975,353 | Gruter | Nov. 8, 1910 |
| 1,027,333 | Hershkowitsch | May 21, 1912 |
| 1,460,179 | Ruthrauff | June 26, 1923 |
| 1,467,024 | Bergve | Sept. 4, 1923 |
| 1,619,076 | Kuever | Mar. 1, 1927 |
| 1,946,460 | Herzog | Feb. 6, 1934 |
| 2,035,267 | Fleischmann | Mar. 24, 1936 |
| 2,035,896 | Kerwin | Mar. 31, 1936 |

FOREIGN PATENTS

| Number | Country | Date |
|---|---|---|
| 66,195 | Austria | Aug. 10, 1914 |
| 305,722 | Germany | May 7, 1918 |
| 764,670 | France | Mar. 12, 1934 |
| 442,857 | Germany | Apr. 8, 1927 |
| 157,667 | Great Britain | Jan. 27, 1921 |